No. 734,197. PATENTED JULY 21, 1903.
C. F. SPLITDORF.
INDUCTION COIL.
APPLICATION FILED MAY 19, 1903.
NO MODEL.

Witnesses
Edward C. Rowland
C. B. Barker

Inventor
Charles F. Splitdorf
By his Attorney
F. W. Barker

No. 734,197. Patented July 21, 1903.

UNITED STATES PATENT OFFICE.

CHARLES F. SPLITDORF, OF NEW YORK, N. Y.

INDUCTION-COIL.

SPECIFICATION forming part of Letters Patent No. 734,197, dated July 21, 1903.

Application filed May 19, 1903. Serial No. 157,829. (No model.)

*To all whom it may concern:*

Be it known that I, CHARLES F. SPLITDORF, a citizen of the United States of America, and a resident of the borough of Manhattan, in the city, county, and State of New York, have invented certain new and useful Improvements in Induction-Coils, of which the following is a specification.

This invention relates to induction-coils; and its purpose is to provide means for arranging the secondary winding thereof in sectional or separated series relation directly upon the insulation enveloping the primary winding, together with improved means for separately inclosing said separate secondary windings and insulating them from each other.

To this end my invention consists in winding two or more secondary coils about the tubular insulation incasing the primary winding, leaving a space intermediate adjacent secondary coils and fitting opposite end caps or covers of cylindrical form over each of said secondary coils, the said caps having circular orifices in their ends, permitting them to slide over the primary insulation, while their cylindrical portions meet and fit together to perfectly inclose their respective secondary coils, an end strand of one secondary coil being continued through its casing to the secondary coil in an adjacent casing.

Figure 1:
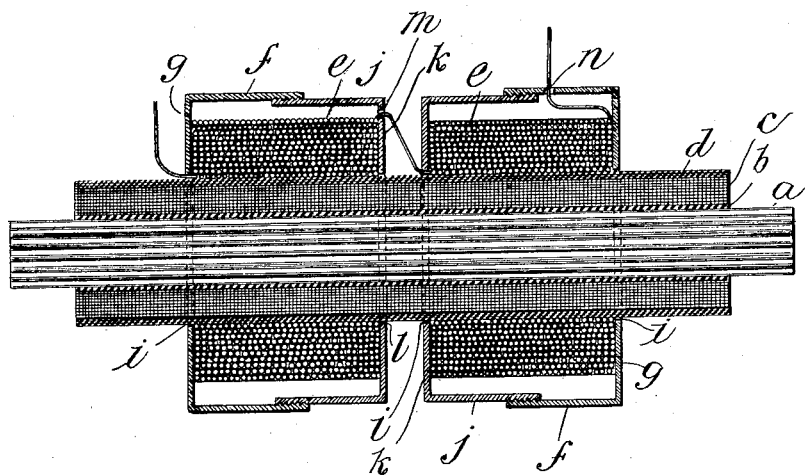
Figure 2:
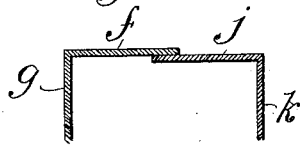

In the drawings accompanying this application, Figure 1 is a vertical sectional view of an induction-coil, showing my sectional secondary winding and the envelops therefor; and Fig. 2 is a partial detail view showing a modified form of connecting the bipart members of the envelop.

I am aware that it is not broadly new with me to arrange the secondary winding in sections, the patent to Bogart, No. 605,174, dated June 7, 1898, showing a plurality of independent spools mounted upon the primary, each of said spools bearing a secondary winding; but I believe it to be original to locate a plurality of separate secondary windings directly upon the insulation covering the primary winding and to perfectly incase such secondary windings each within a separate cover of material possessing to a high degree the quality of non-conductivity.

As seen in the drawings, the letter $a$ indicates the usual core of an induction-coil, being composed of a bundle of soft-iron wires. $b$ indicates the usual insulation surrounding said core, $c$ the primary coil wound or mounted upon said insulation, and $d$ the insulation surrounding the primary. Said insulation $d$ may be of an ordinary character, or it may be of my improved form, as described in my patent application, Serial No. 115,724, filed July 15, 1902, consisting of a sheet of rubber, preferably a thin sheet of hard rubber, wound in spiral manner several times about the primary and forming a tight multiply roll of non-conducting material to serve as a thorough insulation between the primary and secondary windings. Using the said insulation $d$ as a spool I wind or place my secondary wire directly upon the same, producing a secondary coil, as $e$, of relatively short length and increased diameter, and I wind or place two or more of such secondary coils upon insulation $d$.

In order that the separate coils $e$ may be effectually insulated from each other, I provide individual bipart casings for each of said coils. The members of said casings preferably consist, respectively, of a cylindrical portion $f$, with end closure $g$, having the circular orifice $i$, and an opposite cylindrical portion $j$, with end closure $k$, having the circular orifice $l$. The opposite casings slide by their orifices $i$ $l$ over the insulation $d$, their cylinders $f$ $j$ inclosing a secondary coil, their open ends meeting, and one of said ends being of slightly greater diameter than the other to fit snugly thereover, effecting a telescopic joint, or said ends being, respectively, interiorly and exteriorly threaded, enabling them to be screwed together.

Similar bipart casings, as above described, are provided for each of the separate secondary coils or sections of a coil located upon the insulation $d$, and because the material of which said casings is composed is a non-conductor of electricity, as hard rubber, leakage from the individual secondary windings or sections is effectually prevented.

The separate individual secondary windings or sections are connected either by passing the wire through the orifices $i$ $l$ or through perforations, as $m$, which may be provided in the casings. Corresponding perforations, as n, are provided in the casings to permit the terminals of the secondary windings to pass outside said casings.

I do not limit myself to the particular forms of telescoping casings described, being aware that the same may be modified, as by the use of a single cylinder with one end permanently closed and with a removable cap at the opposite end or with opposite removable end caps, as well as by corresponding forms, all of which I consider to be within the scope and spirit of my invention.

Having now described my invention, I declare that what I claim, and desire to secure by Letters Patent, is—

1. In an induction-coil, a plurality of separated secondary windings located about the primary insulation, and separate completely-inclosing means of insulation for said windings.

2. In an induction-coil, a plurality of separated secondary windings located directly upon the primary insulation, and a separate, rigid, insulating-envelop for each of said windings.

3. In an induction-coil, a bipart insulating-casing for the secondary winding thereof, comprising opposite cylindrical inclosing members, adapted at their meeting ends to fit together, and having apertures at their opposite ends to receive the primary winding.

4. In an induction-coil, a plurality of secondary windings located directly upon the primary insulation, and a separate, bipart insulating-envelop for each of said windings.

5. In an induction-coil, an insulating-envelop for the secondary winding comprising a cylindrical casing whose end closures are adapted to fit about the primary insulation.

6. In an induction-coil, a plurality of secondary windings upon the primary insulation, and a separate insulating-envelop for each of said windings, said envelops being perforated for the passage of the secondary wire.

Signed at New York this 5th day of May, 1903.

CHARLES F. SPLITDORF.

Witnesses:
F. W. BARKER,
NAT B. CHADSEY.